US012668037B2

(12) United States Patent
Sato et al.

(10) Patent No.: US 12,668,037 B2
(45) Date of Patent: Jun. 30, 2026

(54) CONTINUOUS ASSEMBLAGE OF POTS FOR CONTINUOUS TRANSPLANTING AND METHOD FOR MANUFACTURING THE ASSEMBLAGE

(71) Applicant: Nippon Beet Sugar Manufacturing Co., Ltd., Tokyo (JP)

(72) Inventors: Hideki Sato, Obihiro (JP); Hidekazu Terasawa, Kamikawa-gun (JP); Kazuhiko Chiba, Kamikawa-gun (JP)

(73) Assignee: NIPPON BEET SUGAR MANUFACTURING CO., LTD., Tokyo (JP)

( * ) Notice: Subject to any disclaimer, the term of this patent is extended or adjusted under 35 U.S.C. 154(b) by 151 days.

(21) Appl. No.: 18/294,603

(22) PCT Filed: Aug. 4, 2022

(86) PCT No.: PCT/JP2022/029969
§ 371 (c)(1),
(2) Date: Feb. 2, 2024

(87) PCT Pub. No.: WO2023/013731
PCT Pub. Date: Feb. 9, 2023

(65) Prior Publication Data
US 2024/0341243 A1     Oct. 17, 2024

(30) Foreign Application Priority Data

Aug. 5, 2021     (JP) ................................. 2021-128980

(51) Int. Cl.
*A01G 9/02*          (2018.01)
*A01G 9/029*         (2018.01)
(Continued)

(52) U.S. Cl.
CPC ................ B32B 3/12 (2013.01); A01G 9/027 (2013.01); A01G 9/0295 (2018.02); B32B 7/12 (2013.01)

(58) Field of Classification Search
CPC .................................. B32B 3/12; A01G 9/027
See application file for complete search history.

(56) References Cited

U.S. PATENT DOCUMENTS

| | | | |
|---|---|---|---|
| 5,595,020 | A | 1/1997 | Ito et al. |
| 5,653,055 | A | 8/1997 | Sunaga et al. |
| 2008/0066378 | A1 | 3/2008 | Terasawa et al. |

FOREIGN PATENT DOCUMENTS

| | | |
|---|---|---|
| JP | S52-55940 A | 5/1977 |
| JP | 07-123869 A | 5/1995 |

(Continued)

OTHER PUBLICATIONS

International Preliminary Report on Patentability for corresponding International Application No. PCT/JP2022/029969 dated Jul. 12, 2023.

(Continued)

*Primary Examiner* — Humera N. Sheikh
*Assistant Examiner* — Julia L Rummel
(74) *Attorney, Agent, or Firm* — Chrisman Gallo Tochtrop LLC

(57)          ABSTRACT

[Problem]
Provided is a continuous assemblage of pots for continuous transplanting capable of handling a seedling crop that requires a wide interval between plants, facilitated in manufacture, and reduced in manufacturing cost, and a method for manufacturing the assemblage.
[Solution]
A link piece 3 is formed by folding back both sides in a width direction of a strip-shaped sheet onto an identical face by one-sixth of a width of the sheet, using a water-soluble
(Continued)

adhesive 21 to attach folded back inner faces, folding back the sheet onto an opposite side of the folding back by a width same as the folded back width, and using the water-soluble adhesive 21 to attach folded back inner faces. A continuous piece 13 is formed by arranging the link pieces 3 in a stagger pattern in a direction in which first folded-back portions 3*a* are opposed, and attaching both side end portions in the width direction of the first folded-back portion 3*a* in one link piece 3 to the first folded-back portion 3*a* of the opposed other link piece 3 using a non-water-soluble adhesive 23. An individual pot 11 is formed between the first folded-back portions 3*a* of the mutually opposed link pieces 3. In a transplantation of the individual pot 11, by expanding the link piece 3, the length between the individual pots 11 is increased, thus allowing handling a seedling crop that requires a wide interval between plants.

4 Claims, 7 Drawing Sheets

(51) Int. Cl.
  B32B 3/12 (2006.01)
  B32B 7/12 (2006.01)

(56) References Cited

FOREIGN PATENT DOCUMENTS

| JP | H08-205687 A | 8/1996 |
| JP | 2007-129968 A | 5/2007 |

OTHER PUBLICATIONS

International Search Report for corresponding International Application No. PCT/JP2022/029969 mailed Sep. 27, 2022.
Written Opinion for corresponding International Application No. PCT/JP2022/029969 dated Sep. 27, 2022.

(a)

21    21

33a
(33b)

39a (39b)

3a    21    21    3a (b)

21    21

55a (55b)

3b    21    3b (c)

3a    21    3a (a)

(b)

(c)

(a)

(b)

(c)

CONTINUOUS ASSEMBLAGE OF POTS FOR CONTINUOUS TRANSPLANTING AND METHOD FOR MANUFACTURING THE ASSEMBLAGE

CROSS-REFERENCE TO RELATED APPLICATIONS

This application is a national stage entry of International Application No. PCT/JP2022/029969 filed on Aug. 4, 2022, which claims the benefit of priority to Japanese Application No. JP2021-128980, filed Aug. 5, 2021, the entire disclosures of which are hereby incorporated herein by reference.

TECHNICAL FIELD

The present invention relates to a continuous assemblage of pots for continuous transplanting used for raising and transplanting seedlings of crops, such as vegetables and flowers and a method of manufacturing the assemblage.

BACKGROUND ART

Conventionally, there has been known a continuous assemblage of pots for raising and transplanting seedlings in which individual quadrangular or hexagonal tubular pots are formed by expanding papers or paper-like sheets and linked by link pieces to form continuous piece. The continuous assemblage of pots for raising and transplanting seedlings is made by overlapping the continuous pieces and using a water-soluble adhesive to attach the overlapping continuous pieces to one another (for example, refer to Patent Documents 1 and 2). This kind of continuous assemblage of pots for raising and transplanting seedlings is kept in a flattened state while in storage and expanded when in use, forming a honeycomb assembly of a number of tightly grouped individual pots. Numbers of seedlings can be intensively cultivated, by filling the individual pots with cultivation soil and sowing the seeds.

Patent Document 1: JP-A-2007-129968
Patent Document 2: JP-A-H08-205687

DISCLOSURE OF THE INVENTION

Problems to be Solved by the Invention

Incidentally, in the continuous assemblage of pots for raising and transplanting seedlings disclosed in Patent Document 1, because it is necessary to group the individual pots tightly, the length of a link piece is arranged as a length from the same to approximately seven times of a width of a side face (one side of the hexagonal tubular shape) of an individual pot. When the seedlings are planted continuously by using a simple planter, the space between neighboring plants is restricted by the length of the link piece, and there is a problem that the interval between the planted seedlings is too short for the crop for which the seedlings are cultivated, so that the continuous assemblage of pots cannot be used for raising and transplanting the crop.

In the continuous assemblage of pots for raising and transplanting seedlings disclosed in Patent Document 2, an extension portion, which is longer than a width of a side face of an individual pot, is provided to a link piece. However, the water does not penetrate sufficiently through the folded portions of the extension portions of the link pieces, and the water-soluble adhesive is not degraded sufficiently while raising the seedlings, so that the folded portions of the link pieces do not stretch and separate smoothly during the transplanting, leading to dispersion in the intervals between the planted seedlings. Another problem is that, not only must the extension portions of the link pieces be folded and attached to one another with the adhesive, but the folded portions must also be attached to the individual pots, complicating the manufacturing process and increasing the cost.

In consideration of these circumstances, it is an object of the present invention to provide a continuous assemblage of pots for continuous transplanting capable of handling a seedling crop that requires a wide interval between plants, facilitated in manufacture, and reduced in manufacturing cost, and a method for manufacturing the assemblage.

Solutions to the Problems

To solve the above-described problems, a continuous assemblage of pots for continuous transplanting of the present invention is a continuous assemblage of pots for continuous transplanting formed by grouping a plurality of hexagonal tubular individual pots. The continuous assemblage of pots for continuous transplanting includes a continuous piece and an individual pot. The continuous piece includes link pieces. The link piece is provided with a first folded-back portion and a second folded-back portion. The first folded-back portion is formed by folding back both sides in a width direction of a strip-shaped sheet onto an identical face by one-sixth of a width of the sheet and using a water-soluble adhesive to attach folded back inner faces. The second folded-back portion is formed by folding back the sheet onto an opposite side of the folding back by a width same as the folded back width and using the water-soluble adhesive to attach folded back inner faces. The link pieces are arranged in a stagger pattern in a direction in which the first folded-back portions are opposed, both side end portions of the first folded-back portion being attached to the opposed first folded-back portion using a non-water-soluble adhesive. The individual pot is formed between the first folded-back portion and the first folded-back portion opposed to the first folded-back portion.

A method for manufacturing a continuous assemblage of pots for continuous transplanting of the present invention is a method for manufacturing a continuous assemblage of pots for continuous transplanting formed by grouping a plurality of hexagonal tubular individual pots. The method includes: a first step of forming a link piece provided with a first folded-back portion and a second folded-back portion, the first folded-back portion being formed by folding back both sides in a width direction of a strip-shaped sheet onto an identical face by one-sixth of a width of the sheet and using a water-soluble adhesive to attach folded back inner faces, the second folded-back portion being formed by folding back the sheet onto an opposite side of the folding back by a width same as the folded back width and using the water-soluble adhesive to attach folded back inner faces; a second step of forming a continuous piece by arranging the link pieces in a stagger pattern in a direction in which the first folded-back portions are opposed, and attaching both side end portions of the first folded-back portion to the opposed first folded-back portion using a non-water-soluble adhesive to form a continuous piece, and forming an individual pot between the first folded-back portion and the first folded-back portion opposed to the first folded-back portion; and a third step of alternately rotating a large number of the continuous pieces 180 degrees and overlapping the continuous pieces while a direction of top faces is maintained, and attaching the overlapped continuous pieces to one another using the water-soluble adhesive.

Effects of the Invention

The present invention can handle the seedling crop that requires a wide interval between plants, facilitate the manufacture, and reduce the manufacturing cost.

DESCRIPTION OF PREFERRED EMBODIMENTS

Figure 1:
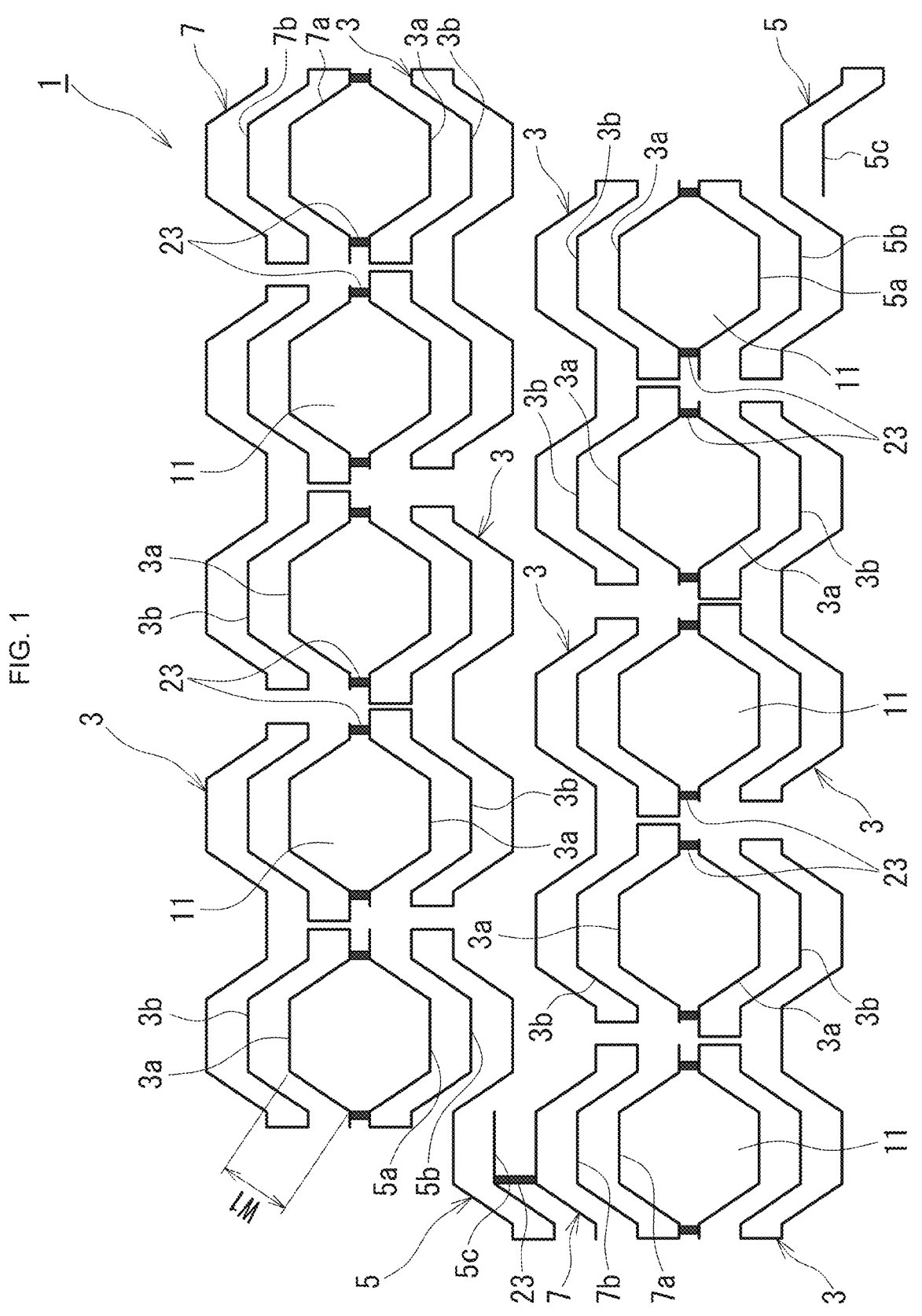
FIG. 1 is a schematic plan view of a structure of a continuous assemblage of pots for continuous transplanting according to one embodiment of the present invention.

An embodiment of the present invention will be described with reference to the attached drawings. In the attached drawings, positions of upper, lower, left, right, and the like of the drawing are determined corresponding to the direction of the reference numerals in the drawing.

Figure 2:
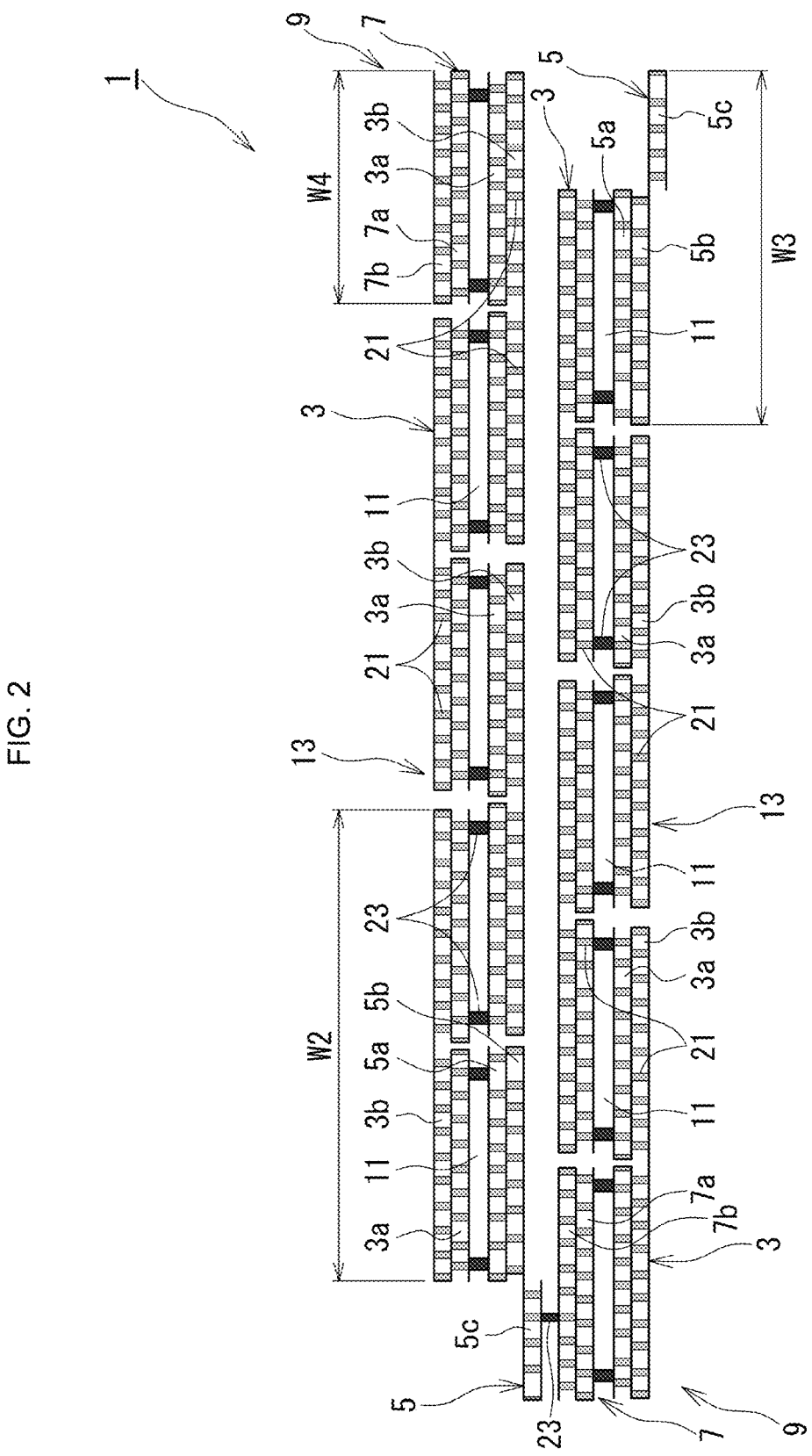
FIG. 2 is a schematic drawing that shows a flattened state of the continuous assemblage of pots for continuous transplanting of FIG. 1.

As illustrated in FIG. 1 and FIG. 2, a continuous assemblage of pots 1 for continuous transplanting (hereinafter referred to as a continuous assemblage of pots) is formed by grouping a plurality of hexagonal tubular individual pots 11. A plurality of link pieces 3, a first connection piece 5, and a second connection piece 7 are connected to form a continuous piece unit 9, and a large number of the continuous piece units 9 are alternately rotated 180 degrees (inverted), overlapped, and attached to one another using a water-soluble adhesive 21, thereby forming the continuous assemblage of pots 1.

Figure 5:
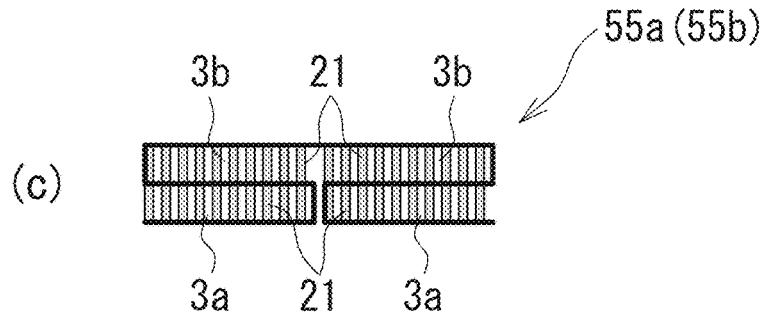
FIG. 5 is a schematic drawing that shows a process of folding back a link piece of the continuous assemblage of pots for continuous transplanting as illustrated in FIG. 2.

As illustrated in FIG. 2, the link piece 3 has an approximately Ω shape in cross-sectional view formed by folding back a rectangular strip-shaped sheet in a width direction of the sheet (the left-right direction in FIG. 2). As illustrated in FIG. 2 and FIG. 5, the link piece 3 is provided with a first folded-back portion 3a and a second folded-back portion 3b. The first folded-back portion 3a is formed by folding back both sides in a width direction (the left-right direction in FIG. 2) of a strip-shaped sheet onto an identical face by one-sixth of a width of the sheet and using the water-soluble adhesive 21 to attach folded back inner faces. The second folded-back portion 3b is formed by folding back the sheet onto the opposite side of the folding back by a width approximately the same as the folded back width and using the water-soluble adhesive 21 to attach inner faces of the folding back. The link piece 3 has a width W2 (see FIG. 2) set to be approximately seven times of a width W1 (see FIG. 1) of one side face (one side of the hexagonal tubular shape) of the individual pot 11.

Figure 6:
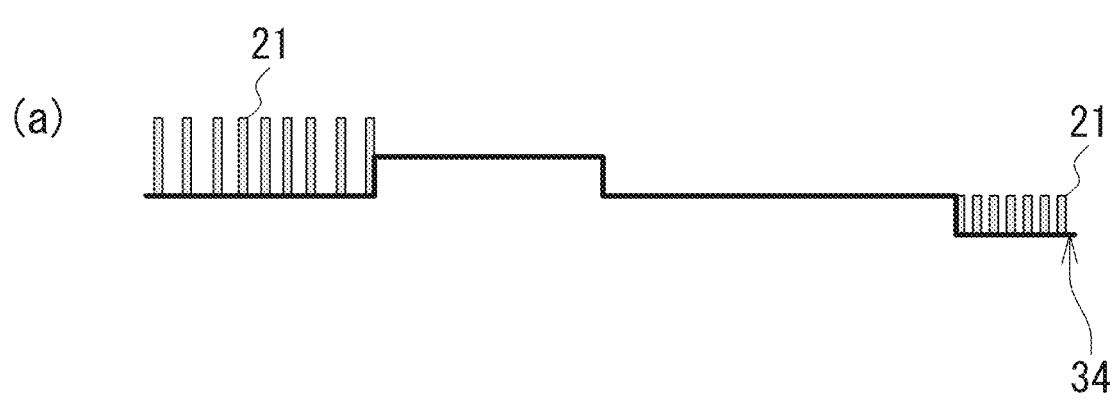
FIG. 6 is a schematic drawing that shows a process of folding back a first connection piece of the continuous assemblage of pots for continuous transplanting as illustrated in FIG. 2.
Figure 6:
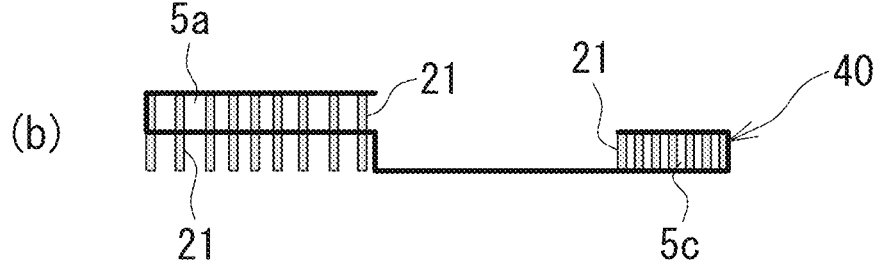
Figure 6:
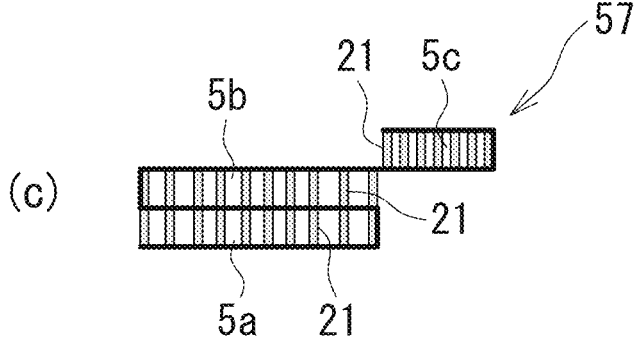

The first connection piece 5 is made of a strip-shaped sheet having a whole length approximately two-third of a whole length of the sheet constituting the link piece 3, and has a serpentine shape with three mountain folds. Specifically, as illustrated in FIG. 2 and FIG. 6, the first connection piece 5 includes a first folded-back portion 5a, a second folded-back portion 5b, and a third folded-back portion 5c. The first folded-back portion 5a and the second folded-back portion 5b are formed in order from one end in a width direction of the sheet by mountain folding the sheet twice, that is, outer tri-folding (z-folding) from the one end by approximately three-fourth of the width so as to provide an approximately equal width. The third folded-back portion 5c is formed by mountain folding the sheet from the other end in the width direction of the sheet by approximately one-fourth of the width so as to provide an approximately equal width while respective inner faces of the first folded-back portion 5a and the second folded-back portion 5b (the outer tri-folded portions) are attached using the water-soluble adhesive 21. Inner faces of the third folded-back portion 5c (the mountain folded portion) are attached using the water-soluble adhesive 21. Thus, the first connection piece 5 is formed. The first connection piece 5 has a width W3 (see FIG. 2) set to be approximately 5.3 times of the width W1 of one side face of the individual pot 11.

Figure 7:
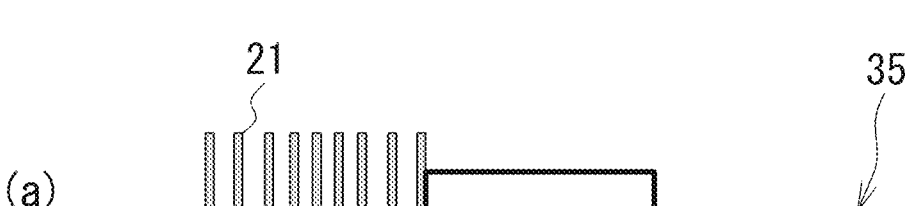
FIG. 7 is a schematic drawing that shows a process of folding back a second connection piece of the continuous assemblage of pots for continuous transplanting as illustrated in FIG. 2.
Figure 7:
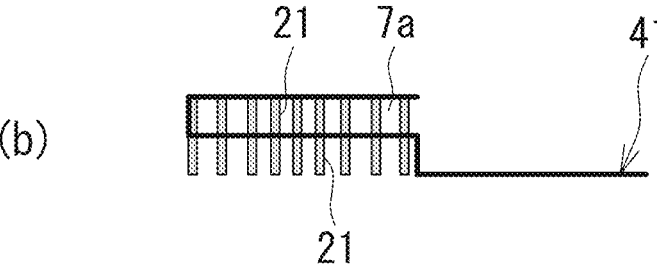
Figure 7:
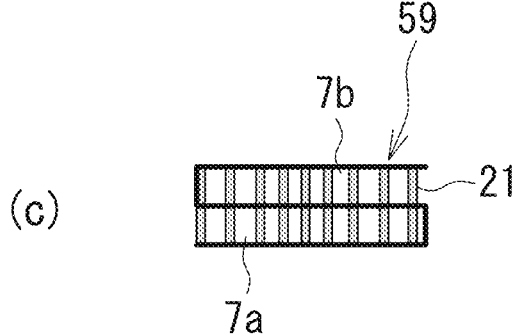

The second connection piece 7 is made of a strip-shaped sheet having a whole length approximately half of the whole length of the sheet constituting the link piece 3, and has a shape with two mountain folds in a serpentine shape. Specifically, as illustrated in FIG. 2 and FIG. 7, the second connection piece 7 includes a first folded-back portion 7a and a second folded-back portion 7b formed by outer tri-folding the sheet into approximately equal three portions. Inner faces of the first folded-back portion 7a and the second folded-back portion 7b (the outer tri-folded portions) are attached using the water-soluble adhesive 21, and thus the second connection piece 7 is formed. The second connection piece 7 has a width W4 (see FIG. 2) set to be approximately 3.5 times of the width W1 of one side face of the individual pot 11.

Next, the continuous piece unit 9 will be described.

As illustrated in FIG. 2, the continuous piece unit 9 is configured by attaching a continuous piece 13 including a plurality of the link pieces 3, the first connection piece 5, and the second connection piece 7. Specifically, a predetermined number of the link pieces 3 are disposed (in the drawing, four link pieces 3 are disposed) in two rows in a stagger pattern to be displaced by ½ pitch (one pitch being an interval that is nearly equal to the total width of one link piece 3) in a direction in which the first folded-back portion 3a of a link piece 3 is opposed to the first folded-back portion 3a of an opposing link piece 3, and both side end portions of the first folded-back portion 3a of the link piece 3 and the first folded-back portion 3a opposed to the first folded-back portion 3a are attached using a non-water-soluble adhesive 23. Consequently, the continuous piece 13 including a plurality of the link pieces 3 is formed. Then, both side end portions (the first folded-back portions 3a of the link piece 3) of the continuous piece 13 are attached to the first folded-back portion 5a of the first connection piece 5 and the first folded-back portion 7a of the second connection piece 7 using the non-water-soluble adhesive 23. Specifically, with an arrangement in a direction in which the first folded-back portion 5a of the first connection piece 5 formed by the outer tri-fold is opposed to the first folded-back portion 3a of the link piece 3 in one side (left side in FIG. 2), both end portions of the first folded-back portion 3a of the link piece 3 in the one side and the first folded-back portion 5a of the first connection piece 5 are attached using the non-water-soluble adhesive 23 such that the end portion of the first folded-back portion 5a of the first connection piece 5 is positioned at approximately the center of the link piece 3. Further, with an arrangement in a direction in which the first folded-back portion 7a of the second connection piece 7 is opposed to the first folded-back portion 3a of the link piece 3 in the other side (right side in FIG. 2), both end portions of the first folded-back portion 3a of the link piece 3 in the other side and the first folded-back portion 7a of the second connection piece 7 are attached using the non-water-soluble adhesive 23 such that the end portion of the first folded-back portion 7a of the second connection piece 7 is positioned at approximately the center of the link piece 3. Thus, the continuous piece 13 (a plurality of link pieces 3), the first connection piece 5, and the second connection piece 7 are connected to form one of the continuous piece units 9. At this time, the individual pots 11 are formed between the first folded-back portion 3a of the link piece 3 and the first folded-back portion 3a opposed to the first folded-back portion 3a, between the first folded-back portion 3a of the link piece 3 and the first folded-back portion 5a of the first connection piece 5 opposed to the first folded-back portion 3a, and between the first folded-back portion 3a of the link piece 3 and the first folded-back portion 7a of the second connection piece 7 opposed to the first folded-back portion 3a. Specifically, non-attached portions formed between the portions attached using the non-water-soluble adhesive 23 (attachment portions) are provided as the individual pots 11.

Note that a predetermined number of the continuous piece units 9 are alternately rotated 180 degrees (inverted) and overlapped while the direction of the top face is maintained, and are mutually attached using the water-soluble adhesive 21 (not illustrated). Further, the third folded-back portion 5c of the first connection piece 5 of one of the continuous piece units 9 is attached to the second folded-back portion 7b of the second connection piece 7 of another of the continuous piece units 9 overlapped to be attached to this continuous piece unit 9 using the non-water-soluble adhesive 23 (left side in FIG. 2). Thus, the continuous assemblage of pots 1 (in FIG. 2, the continuous assemblage of pots 1 including the two continuous piece units 9) is formed. At this time, the continuous piece units 9 are arranged such that a ridgeline of the third folded-back portion 5c of the first connection piece 5 that is one side end portion of one of the continuous piece units 9 is overlapped with the end portion of the second folded-back portion 7b of the second connection piece 7 that is one side end portion of another of the continuous piece units 9 overlapped to be attached to this continuous piece unit 9 in an up-down direction. Accordingly, as illustrated in FIG. 2, the non-attached portions (the individual pots 11) are arranged in a stagger pattern such that the center portions of the non-attached portions are positioned in the middle between the adjacent two non-attached portions in the upper and lower continuous piece units 9, 9.

The continuous assemblage of pots 1 is provided in a flattened state (see FIG. 2) while in storage. While the seedlings are being raised, the continuous assemblage of pots 1 is expanded from the flattened state, that is, extended in the layering direction of the continuous assemblage of pots 1. Thus, as illustrated in FIG. 1, the multiple individual pots 11 are expanded in a honeycomb pattern, and appear as an assemblage. Furthermore, during transplanting after the seedlings are raised, by extending the continuous assemblage of pots 1 in a pulled-apart direction, the flattened state of the link piece 3, the first connection piece 5, and the second connection piece 7 are released, and the individual pots 11 are each pulled apart in a row (see FIG. 3). At this time, an attached face of the attachment portion of the non-water-soluble adhesive 23 between the first connection piece 5 and the second connection piece 7, that is, an attached face formed by attaching the third folded-back portion 5c of the first connection piece 5 and the second folded-back portion 7b of the second connection piece 7 using the non-water-soluble adhesive 23 is parallel to the pulled-apart direction of the individual pot 11.

Next, a method for manufacturing the continuous assemblage of pots 1 for continuous transplanting (the continuous assemblage of pots) will be described by referring to FIG. 4 to FIG. 7.

Figure 4:
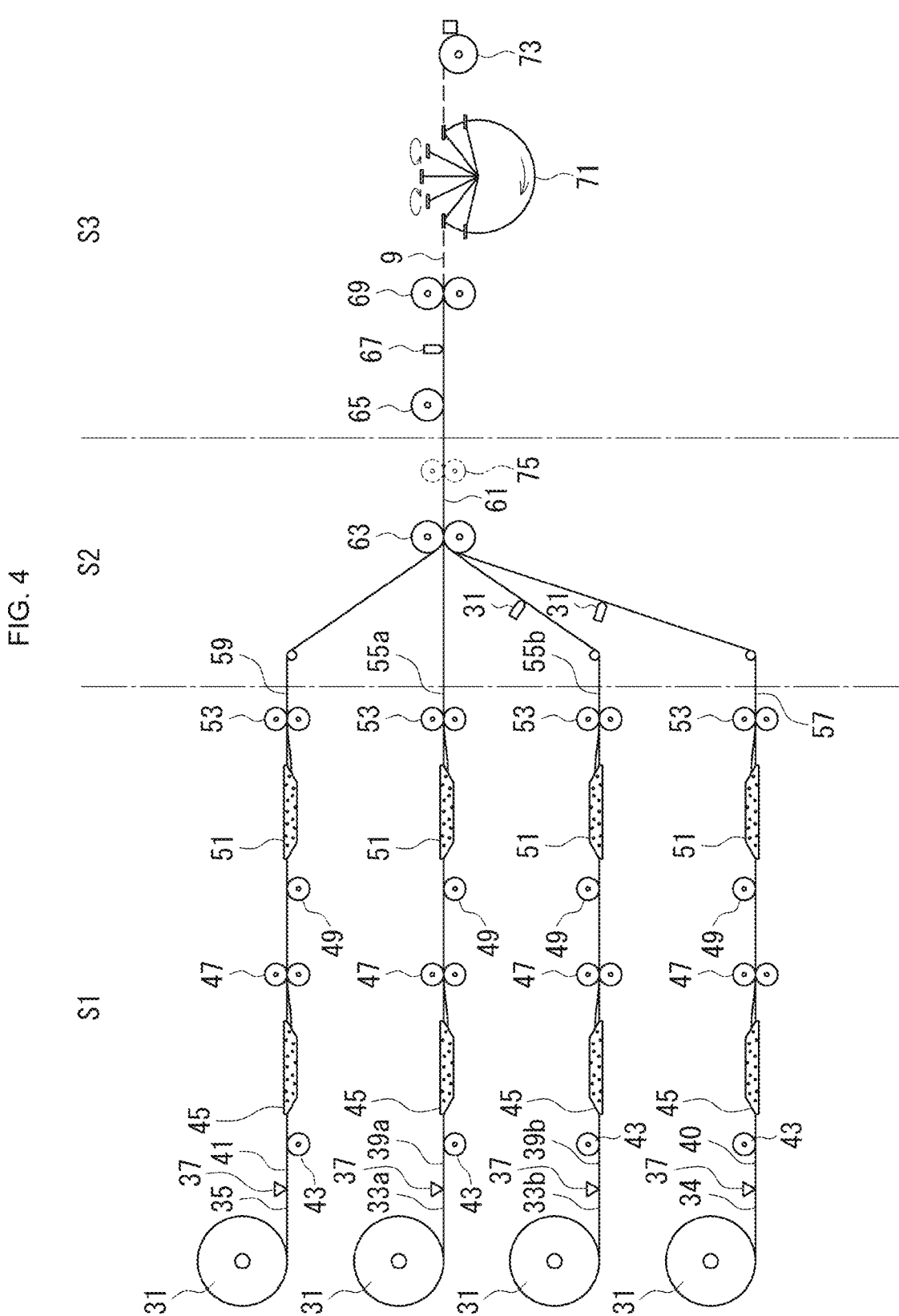
FIG. 4 is a schematic drawing that shows a manufacturing process for the continuous assemblage of pots for continuous transplanting as illustrated in FIG. 2.

The method for manufacturing the continuous assemblage of pots 1 includes, as illustrated in FIG. 4, Step S1 (first step) of forming the link piece 3, the first connection piece 5, and the second connection piece 7, Step S2 (second step) of connecting the link piece 3, the first connection piece 5, and the second connection piece 7 to form one strip-shaped continuous piece unit 61, and Step S3 (third step) of forming the continuous assemblage of pots 1.

First, in Step S1 of forming the link piece 3, the first connection piece 5, and the second connection piece 7, base papers 33a, 33b, 34, 35 are pulled out from respective base paper rolls 31, around which sheets 33a, 33b, 34, 35 (base papers) for forming a plurality of the link pieces 3 (in the drawing, two), the first connection piece 5, and the second connection piece 7 are wound, and the pulled out base papers 33a, 33b, 34, 35 are cut into predetermined numbers of strip-shaped sheets 39a, 39b, 40, 41 having predetermined widths by corresponding slitters 37, respectively. Then, each of the strip-shaped sheets 39a, 39b, 40, 41 is sequentially transferred to corresponding tube-making adhesive application roller 43 and tube-making unit 45 (mold gutter), the tube-making adhesive application roller 43 applies the water-soluble adhesive 21 over one face (see FIG. 5a, FIG. 6a, and FIG. 7a), and the tube-making unit 45 forms the strip-shaped sheet into a tubular shape. Then, each of the strip-shaped sheets 39a, 39b, 40, 41 formed in the tubular shape is transferred to a pressing roller 47, and the inner face is attached. Consequently, the first folded-back portions 3a, 7a are formed at the strip-shaped sheets 39a, 39b, 41 corresponding to the link piece 3 and the second connection piece 7 (see FIG. 5b and FIG. 7b), and the first folded-back portion 5a and the third folded-back portion 5c are formed at the strip-shaped sheet 40 corresponding to the first connection piece 5 (see FIG. 6b).

Then, each of the strip-shaped sheets 39a, 39b, 40, 41 at which the folded-back portion is formed is sequentially transferred to a tube-making adhesive application roller 49, a tube-making unit 51 (mold gutter), and a pressing roller 53, the tube-making adhesive application roller 49 applies the water-soluble adhesive 21 over one face (see FIG. 5b, FIG. 6b, and FIG. 7b), the tube-making unit 51 forms the strip-shaped sheet into a tubular shape, and the pressing roller 53 attaches the inner face. Thus, the second folded-back portions 3b, 5b, 7b are formed at the strip-shaped sheets 39a, 39b, 40, 41, and strip-shaped link pieces 55a, 55b, a strip-shaped first connection piece 57, and a strip-shaped second connection piece 59 are formed (see FIG. 5c, FIG. 6c, and FIG. 7c). After these are formed, the process proceeds to the second step S2.

Next, in Step S2 of connecting the strip-shaped link pieces 55a, 55b, the strip-shaped first connection piece 57, and the strip-shaped second connection piece 59 to form one strip-shaped continuous piece unit 61, the strip-shaped link pieces 55a, 55b are arranged in two upper and lower stages in a stagger pattern, a link piece adhesive application unit 31 applies lines of the non-water-soluble adhesive 23 over the strip-shaped link piece 55b in the lower stage, and the strip-shaped link pieces 55a, 55b are transferred to a flattening roller 63. Then, the flattening roller 63 attaches the strip-shaped link piece 55a and the strip-shaped link piece 55b to form a strip-shaped continuous piece. At this time, the strip-shaped first connection piece 57 is arranged at one end portion of the strip-shaped continuous piece, the strip-shaped second connection piece 59 is arranged at the other end portion of the strip-shaped continuous piece, and the strip-shaped first connection piece 57 is attached to the strip-shaped link piece 55a in the upper stage and the strip-shaped second connection piece 59 is attached to the strip-shaped link piece 55b in the lower stage using the non-water-soluble adhesive 23. Consequently, the strip-shaped continuous piece unit 61 is formed. After the strip-shaped continuous piece unit 61 is formed, the process proceeds to the third step S3.

Next, in Step S3 of forming the continuous assemblage of pots 1, the strip-shaped continuous piece unit 61 is sequentially transferred to an adhesive application roller 65 and an adhesive application unit 67, the adhesive application roller 65 applies the water-soluble adhesive 21 over a top face of the strip-shaped continuous piece unit 61, and the adhesive application unit 67 applies the non-water-soluble adhesive 23 over the strip-shaped second connection piece 59 positioned at a side end of the strip-shaped continuous piece unit 61.

The strip-shaped continuous piece unit 61 applied with the water-soluble adhesive 21 and the non-water-soluble adhesive 23 is cut to a predetermined width (equal to the height of the individual pot 11) by a rotary cutter 69 to form the continuous piece unit 9. Then, the continuous piece unit 9 is transferred to an inverting unit 71, rotated 180 degrees every other continuous piece unit 9 by the inverting unit 71 while the direction of the top face is maintained, and transferred to a layering attachment unit 73. Then, the layering attachment unit 73 layers and attaches the continuous piece units 9 to one another via the water-soluble adhesive 21 and the non-water-soluble adhesive 23. Thus, the continuous assemblage of pots 1 is formed (see FIG. 2).

Although omitted in FIG. 4, the adhesive application roller 65 is provided with a detector that detects the transferred amount of the strip-shaped continuous piece unit 61. When a predetermined amount of the strip-shaped continuous piece unit 61 is transferred to the rotary cutter 69, the water-soluble adhesive 21 and the non-water-soluble adhesive 23 are not applied over the top face of the strip-shaped continuous piece unit 61 in the length corresponding to the width of the continuous piece unit 9 (the height of the individual pot 11). Accordingly, a predetermined number of the continuous piece units 9 are layered and attached by the layering attachment unit 73, and can be extracted one by one as the continuous assemblage of pots 1.

The continuous assemblage of pots 1 according to the embodiment can provide the following operational advantages.

Figure 3:
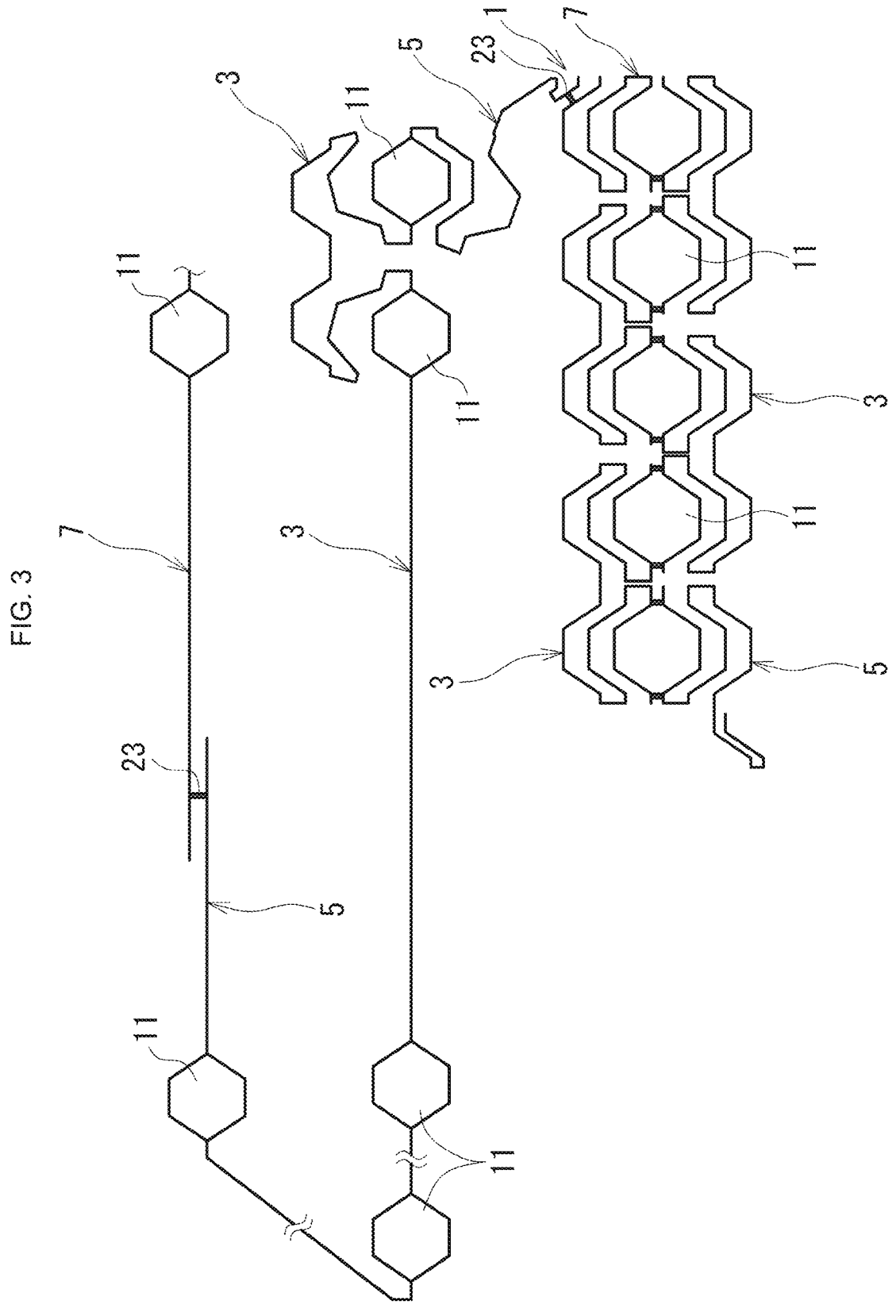
FIG. 3 is a schematic drawing that shows a pulled-apart state of the continuous assemblage of pots for continuous transplanting of FIG. 1.

When seedlings are raised in the respective individual pots 11 of the continuous assemblage of pots 1 in the expanded state (see FIG. 1) for a predetermined number of days, the water-soluble adhesive 21 applied over the folded-back faces of the link piece 3, the first connection piece 5, and the second connection piece 7 and the water-soluble adhesive 21 applied between the continuous piece units 9 deteriorate due to watering during the raising of the seedlings. Accordingly, in transplantation after the raising of the seedlings, by pulling one end of the continuous assemblage of pots 1, the respective individual pots 11 are pulled apart in a row as illustrated in FIG. 3, thereby allowing the efficient planting.

According to the continuous assemblage of pots 1, when the respective individual pots 11 are pulled apart in a row (see FIG. 3), the length between the individual pot 11 and the individual pot 11 is approximately 15 times of the width W1 of one side face (one side of the hexagonal tubular shape) of the individual pot 11, thus allowing effectively handling the cultivation of a crop that requires a wide interval between plants.

Furthermore, according to the continuous assemblage of pots 1, since the third folded-back portion 5c of the first connection piece 5 and the first folded-back portion 7b of the second connection piece 7 are disposed in the mutually opposed direction, and the third folded-back portion 5c of the first connection piece 5 is attached to the second folded-back portion 7b of the second connection piece 7 using the non-water-soluble adhesive 23, in the transplantation of the individual pot 11, the attached face of the attachment portion of the non-water-soluble adhesive 23 between the first connection piece 5 and the second connection piece 7 is parallel to the pulled-apart direction of the individual pot 11 (see FIG. 3), thus ensuring the sufficient strength. Accordingly, delamination of the attachment portion does not occur during the transplantation, and the individual pots 11 are stably pulled apart.

According to the continuous assemblage of pots 1, when the continuous piece units 9 are layered and attached to one another via the water-soluble adhesive 21, the non-attached portions (the individual pot 11 formation portions) formed between the attachment portions are arranged in a stagger pattern such that the center portions of the non-attached portions are positioned in the middle between the adjacent two non-attached portions in the upper and lower continuous piece units 9, 9 in the expanded direction of the continuous assemblage of pots 1. Therefore, since the hexagonal individual pots 11 expanded by opening in the expanded direction do not interfere with one another, the hexagonal shapes of the respective individual pots 11 can be made approximately uniform.

According to the method for manufacturing the continuous assemblage of pots 1, the link piece 3, the first connection piece 5, and the second connection piece 7 are formed, the formed link piece 3, first connection piece 5, and second connection piece 7 are attached using the non-water-soluble adhesive 23 to form the continuous piece unit 9, and the continuous piece units 9 are layered and attached to one another via the water-soluble adhesive 21 to form the continuous assemblage of pots 1. Therefore, since the continuous assemblage of pots 1 can be easily manufactured without a complicated process, the manufacturing cost can be reduced, and the contribution to the improvement of the manufacturing accuracy can be made.

Note that at positions corresponding to crests of the individual pots 11 (the hexagonal tubular shapes) formed by expanding the continuous assemblage of pots 1, perforations may be provided. When the perforations are provided, in the second step S2 of the manufacturing method, a perforation processing unit 75 (see FIG. 4) is provided immediately after the flattening roller 63, thereby forming the perforations to the continuous piece unit 9. Thus, forming the perforations at the crests of the individual pots 11 allows the even expanding, thus reducing a tensile force required in the expanding and reducing labors of the worker. While the cut width and the interval of the perforation can be appropriately changed, when the individual pot 11 is transplanted, it is necessary to have the strength not to be cut at the perforations.

DESCRIPTION OF REFERENCE SIGNS

1 Continuous assemblage of pots for continuous transplanting (continuous assemblage of pots)
3 Link piece
3a First folded-back portion
3b Second folded-back portion
5 First connection piece
7 Second connection piece
11 Individual pot
21 Water-soluble adhesive
23 Non-water-soluble adhesive
The invention claimed is:
1. A continuous assemblage of pots for continuous transplanting formed by grouping a plurality of hexagonal tubular individual pots, comprising:
a continuous piece, the continuous piece comprising:
a plurality of link pieces, each link piece being made of a first strip-shaped sheet and comprising a first left folded-back portion, a first right folded-back portion, a second left folded-back portion, and a second right folded-back portion;
wherein the first left folded-back portion is formed by folding a left end of the first sheet 180° clockwise and using a water-soluble adhesive to attach the left end of the first sheet to a center-left portion of the first sheet, wherein the left end of the first sheet is one-sixth of a width of the first sheet;
wherein the first right folded-back portion is formed by folding a right end of the first sheet 180° counter-clockwise and using the water-soluble adhesive to attach the right end of the first sheet to a center-right portion of the first sheet, wherein the right end of the first sheet is one-sixth of a width of the first sheet;
wherein the second left folded-back portion is formed by folding the first left folded-back portion 180° counter-clockwise and using the water-soluble adhesive to attach the first left folded-back portion to a center portion of the first sheet, wherein the first left folded-back portion is the same width as the left end of the first sheet and covers a left half of the center portion of the first sheet;
wherein the second right folded-back portion is formed by folding the first right folded-back portion 180° clockwise and using the water-soluble adhesive to attach the first right folded-back portion to the center portion of the first sheet, wherein the first right folded-back portion is the same width as the right end of the first sheet and covers a right half of the center portion of the first sheet;
wherein the plurality of link pieces are disposed in a first row and a second row in a stagger pattern such that the link pieces of the first row are displaced from the link pieces of the second row by one-half of a width of a link piece and the left first folded-back portions and the right first folded-back portions of the link pieces of the first row are opposed to and facing the left first folded-back portions and the right first folded-back portions of the link pieces of the second row;
wherein outer edges of the left first folded-back portions and the right first folded-back portions of the link pieces of the first row are attached to inner edges of the left first folded-back portions and the right first folded-back portions of the link pieces of the second row using a non-water-soluble adhesive;
wherein inner edges of the left first folded-back portions and the right first folded-back portions of the link pieces of the first row are attached to outer edges of the left first folded-back portions and the right first folded-back portions of the link pieces of the second row using a non-water-soluble adhesive;
wherein individual pots are formed between the left first folded-back portions of the link pieces of the first row and the opposing left first folded-back portions of the link pieces of the second row, and individual pots are formed between the right first folded-back portions of the link pieces of the first row and the opposing right first folded-back portions of the link pieces of the second row, such that a row of individual pots is formed between the first row and the second row;
and the continuous piece further comprising:
a first connection piece being made of a second strip-shaped sheet having a length approximately two-thirds of a length of the first strip-shaped sheet, and comprising a third folded-back portion, a fourth folded-back portion and a fifth folded-back portion;
wherein the third folded-back portion is formed by folding a left end of the second sheet 180° clockwise and using the water-soluble adhesive to attach the left end of the second sheet to a center-left portion of the second sheet, wherein the left end of the second sheet is approximately one-fourth of a width of the second sheet;
wherein the fourth folded-back portion is formed by folding the third folded-back portion 180° counter-clockwise and using the water-soluble adhesive to attach the third folded-back portion to a center portion of the second sheet, wherein the fourth folded-back portion is approximately the same width as the third folded-back portion;
wherein the fifth folded-back portion is formed by folding a right end of the second sheet 180° counter-clockwise and using the water-soluble adhesive to attach the right end of the second sheet to a center-right portion of the second sheet, wherein the right end of the second sheet is approximately one-eighth of the width of the second sheet;
wherein both edges of the third folded-back portion are attached to both edges of either the left first folded-back portion or the right first folded-back portion of a link piece located at an end of the first row using the non-water-soluble adhesive, such that an end portion of the third folded-back portion is positioned at approximately a center of the link piece located at the end of the first row;
wherein a first end individual pot is formed between the left or right first folded-back portion of the link piece located at the end of the first row and the third folded-back portion of the first connection piece, the first end individual pot being located at a first end of the row of individual pots;

a second connection piece being made of a third strip-shaped sheet having a length approximately one-half of the length of the first strip-shaped sheet, and comprising a sixth folded-back portion and a seventh folded-back portion;

wherein the sixth folded-back portion is formed by folding a left end of the third sheet 180° clockwise and using the water-soluble adhesive to attach the left end of the third sheet to a center portion of the third sheet, wherein the left end of the third sheet is approximately one-third of a width of the third sheet;

wherein the seventh folded-back portion is formed by folding the sixth folded-back portion 180° counterclockwise and using the water-soluble adhesive to attach the sixth folded-back portion to a right end of the third sheet, wherein the seventh folded-back portion is approximately the same width as the sixth folded-back portion;

wherein both edges of the sixth folded-back portion are attached to both edges of either the left first folded-back portion or the right first folded-back portion of a link piece located at an end of the second row using the non-water-soluble adhesive, such that an end portion of the sixth folded-back portion is positioned at approximately a center of the link piece located at the end of the second row;

wherein a second end individual pot is formed between the left or right first folded-back portion of the link piece located at the end of the second row and the sixth folded-back portion of the second connection piece, the second end individual pot being located at a second end of the row of individual pots;

wherein the continuous assemblage of pots further comprises a plurality of rows of individual pots, wherein adjacent rows of individual pots are arranged in a stagger pattern such that each individual pot is positioned in a middle between individual pots of adjacent rows, adjacent rows of individual pots are attached to each other with the water-soluble adhesive; and wherein the fifth folded-back portions of the first connection pieces of each row of individual pots are attached to the seventh folded-back portions of the second connection pieces of adjacent rows of individual pots using the non-water-soluble adhesive.

2. A continuous assemblage of pots for continuous transplanting according to claim 1, wherein each link piece is provided with perforations at a position of a crest of the hexagonal tubular individual pots.

3. A method for manufacturing a continuous assemblage of pots for continuous transplanting according to claim 1 comprising providing a continuous piece, folding the continuous piece, and using adhesives to form the continuous assemblage of pots of claim 1.

4. A method for manufacturing a continuous assemblage of pots for continuous transplanting according to claim 2 comprising providing a continuous piece, folding the continuous piece, and using adhesives to form the continuous assemblage of pots of claim 2.

* * * * *